(12) United States Patent
Di Dio et al.

(10) Patent No.: US 11,971,110 B2
(45) Date of Patent: Apr. 30, 2024

(54) VALVE ASSEMBLY AND METHOD

(71) Applicant: FAS MEDIC S.A., Palézieux (CH)

(72) Inventors: Joël Di Dio, Geneva (CH); Florent Junod, Corsier (CH)

( * ) Notice: Subject to any disclaimer, the term of this patent is extended or adjusted under 35 U.S.C. 154(b) by 0 days.

(21) Appl. No.: 17/973,885

(22) Filed: Oct. 26, 2022

(65) Prior Publication Data

US 2023/0125219 A1    Apr. 27, 2023

(30) Foreign Application Priority Data

Oct. 27, 2021 (EP) .................................. 21204951.4

(51) Int. Cl.
*F16K 17/04* (2006.01)
*F16K 11/044* (2006.01)
*G05D 16/20* (2006.01)

(52) U.S. Cl.
CPC ............ *F16K 17/04* (2013.01); *F16K 11/044* (2013.01); *G05D 16/2022* (2019.01)

(58) Field of Classification Search
CPC ............ F16K 31/0644; F16K 31/0655; F16K 31/0693
USPC ........................................ 251/129.16, 129.17
See application file for complete search history.

(56) References Cited

U.S. PATENT DOCUMENTS

| | | | |
|---|---|---|---|
| 4,767,097 A | 8/1988 | Everett et al. | |
| 4,858,886 A | 8/1989 | Tatara | |
| 5,240,227 A * | 8/1993 | Sich | F16K 31/0689 251/129.17 |
| 5,374,029 A * | 12/1994 | Bailey | F16K 31/0624 251/129.21 |
| 5,427,352 A * | 6/1995 | Brehm | F15B 13/0405 251/64 |
| 5,447,288 A * | 9/1995 | Keuerleber | H01F 7/1638 251/129.17 |
| 5,547,165 A * | 8/1996 | Brehm | F16H 61/0251 251/129.08 |

(Continued)

FOREIGN PATENT DOCUMENTS

| | | |
|---|---|---|
| CN | 112 303 250 A | 2/2021 |
| CN | 112 413 136 B | 6/2021 |

(Continued)

OTHER PUBLICATIONS

European Search Report prepared by the European Patent Office in application No. EP 20 18 8596 dated Mar. 3, 2021.

(Continued)

*Primary Examiner* — Robert K Arundale
(74) *Attorney, Agent, or Firm* — McDonnell Boehnen Hulbert & Bergoff LLP

(57) ABSTRACT

A method for assembling a valve is disclosed. The valve includes a first fluid port, a second fluid port, a fluid path providing fluid communication therebetween, a moveable member, a biasing member and a pressure compensation membrane. The method includes the steps of providing a base member comprising an abutment for receiving a first of the biasing member and the pressure compensation membrane; assembling the biasing member and the pressure compensation membrane with the base member; and affixing a fixing member to the base member to retain the biasing member and the pressure compensation membrane between the fixing member and the abutment.

16 Claims, 3 Drawing Sheets

(56) References Cited

U.S. PATENT DOCUMENTS

| | | |
|---|---|---|
| 2002/0000530 A1 | 1/2002 | Kumar |
| 2002/0079472 A1 | 6/2002 | Kumar |
| 2009/0250021 A1 | 10/2009 | Zarrabi et al. |
| 2017/0074417 A1 | 3/2017 | Okawara |
| 2019/0277422 A1* | 9/2019 | Strasswiemer ..... F16K 31/0693 |

FOREIGN PATENT DOCUMENTS

| | | |
|---|---|---|
| EP | 3 263 962 A1 | 1/2018 |
| JP | S63-157580 U | 10/1988 |

OTHER PUBLICATIONS

European Search Report prepared by the European Patent Office in application No. EP 21 20 4951 dated Apr. 11, 2022.

\* cited by examiner

VALVE ASSEMBLY AND METHOD

CROSS REFERENCE TO RELATED APPLICATIONS

The present application claims priority to European Patent Application No. 21204951.4 filed Oct. 27, 2021, the entire contents of which are herein incorporated by reference as if fully set forth in this description.

TECHNICAL FIELD

The invention relates to fluid control valves. In particular, the invention relates to improvements in pressure compensated fluid control valves.

BACKGROUND OF THE INVENTION

Various forms of fluid flow control valves, which can be suitable for controlling the flow of liquids or gases, are known in the art. Such valves include on/off switching valves, pressure control valves and proportional flow control valves, and are generally actuated by an input actuator, which can be provided in the form of a solenoid. A solenoid may be used to generate a magnetic field which can exert a magnetic force on a valve member to provide opening, closing and/or switching of the valve. Such valves typically include a biasing member that generates a biasing force to oppose the magnetic force. Therefore, in the absence of a magnetic field from the solenoid, the biasing force maintains the valve in a normally open or normally closed position.

In valves for precision applications, it can be particularly important to provide predictable, repeatable operation of the valve, which is resistant to undue influence by external factors such as supply pressure or flow rates, to ensure correct operation of equipment into which the valve is integrated. Such factors can be particularly important in micro-fluidic valves, since the smaller sizes of components and of the assembly mean variation in component properties or valve operation can have a relatively large effect on the overall performance of the valve. One way of improving repeatability and resilience to external pressure variations is to provide a pressure-compensated valve.

The inventors have identified a need to modify known valve structures in order to permit the miniaturisation of valves, to improve the manufacture and assembly of valves, and to allow for the smaller displacements and actuating forces which may be experienced when seeking to create a smaller sized valve having improved reliability and accuracy.

SUMMARY OF THE INVENTION

An issue identified with prior art valves, such as pressure compensation valves, relates to means for mounting a membrane, which is comprised in the valve and against which pressure from fluid may act to exert a pressure compensating force. The axial dimensions of retaining means for such a membrane in prior art valve assemblies is often times dependent on the dimensions and relative positions of several components of the valve. This makes it difficult to precisely control the dimensions of the membrane.

Prior art pressure compensated valves can typically be assembled using a method wherein the spring is fixed within the valve body separately to the membrane. That is to say, the spring is assembled within the valve during a step which is independent of the fixing of the membrane within the valve. The inventors of the present invention have recognised that assembly of the valve can be made more efficient by retaining both spring and membrane in place in the valve or in a sub-assembly with a single retaining member and a single related retaining step. This may include clamping both edges, i.e. the inner and outer edges, of both the spring and the membrane in non-pivoting fixed relation to the valve body and/or the moveable member, using the force from a single fixing member at each (e.g. inner and outer) edge.

According to a first aspect of the invention there is provided a method for assembling a valve, the valve comprising any or all of:
  a valve body, the valve body comprising a first fluid port, a second fluid port and a fluid path providing fluid communication therebetween;
  a moveable member configured to be actuated to vary a flow restriction in the fluid path by advancing a sealing member toward or away from a valve seat of the valve;
  a biasing member configured to bias the moveable member toward or away from the valve seat; and
  a pressure compensation membrane configured to provide at least one surface on which a pressure from at least one of the first and second fluid ports can act to provide a pressure compensating force to the moveable member; the method comprising any or all of the following steps:
  providing a base member comprising an abutment for receiving at least a first of the biasing member and the pressure compensation membrane;
  assembling the biasing member and the pressure compensation membrane with the base member; and
  affixing a fixing member to the base member to retain both the biasing member and the pressure compensation membrane between the fixing member and the abutment.

By using a common fixing member to retain the biasing member and the pressure compensation membrane in this way, the appropriate positioning of the biasing member and the pressure compensation membrane can be facilitated in a single step. This can be contrasted with prior assemblies, in which (at least) one component is used to secure the biasing member(s) in the valve and at least one separate component is used to secure the pressure compensation membrane in the valve. The result is a more efficient assembly method and a more efficient resulting valve structure. Variations in tolerances and tolerance stack-up between multiple different components in the assembly can also be reduced, since fewer components and retaining features are present. The valve is arranged so that a pressure from at least one of the first and second fluid ports can act to provide a pressure compensating force to the moveable member via the pressure compensation membrane.

The valve may comprise a spacer. The spacer may be configured to separate a portion of the biasing member from a portion of the pressure compensation membrane. The valve may comprise a sub-assembly. The sub-assembly may comprise the biasing member, pressure compensation membrane and/or the spacer. The step of assembling the biasing member and the pressure compensation membrane with the base member may comprise disposing the spacer between the biasing member and the pressure compensation membrane. The step of affixing the fixing member to the base member may retain the sub-assembly between the fixing member and the abutment.

The step of affixing the fixing member may comprise securing a second of the biasing member and the pressure compensation membrane between the fixing member and the spacer. The method may be implemented such that the biasing member and the pressure compensation membrane, which may be comprised in the sub-assembly, can be retained against the base member solely by the fixing member. The method may be implemented such that the biasing member and the pressure compensation member can be fixed in the valve solely by the fixing member. The method may be implemented such that the axial position of the biasing member and/or the pressure compensation membrane can be retained solely by the fixing member. In other words, the biasing member and the pressure compensation membrane can be retained in the valve solely by the step of affixing the fixing member to the base member such that without this step, neither the biasing member nor the pressure compensation membrane would be securely held in the valve assembly.

The method may be applied for retaining the laterally or radially inner and/or outer portions of the biasing member and/or the pressure compensation membrane in the valve.

The method may comprise the steps of disposing the biasing member against the abutment and/or disposing the fixing member against the pressure compensation membrane. The method may comprise the steps of disposing the pressure compensation membrane against the abutment and/or disposing the fixing member against the biasing member. The abutment may comprise a shoulder of the housing.

The base member may be comprised in at least a portion of a housing of the valve body.

The spacer may comprise a valve body spacer which may comprise an annular member. The annular member may be a washer. The method may comprise arranging the valve body spacer within the housing, preferably against an inner wall thereof. The method may comprise introducing the spacer into the housing and may further comprise retaining the spacer in fixed relation to the housing by the fixing member. The fixing member may be comprised in at least a portion of the valve body. The method may comprise affixing the valve body to the housing, for example by a press-fit.

The method may comprise providing a housing comprising an abutment for receiving one of the biasing member and the pressure compensation membrane. The method may further comprise assembling the spacer between the biasing member and the pressure compensation membrane to form a sub-assembly. The method may further comprise disposing the sub-assembly, or a component of it, against the housing, particularly a shoulder of the housing. The method may comprise disposing the valve body at a laterally or radially outer portion of the sub-assembly or a component of it. The method may further comprise affixing the valve body to the housing to retain the sub-assembly between the valve body and the housing. The sub-assembly may be retained against the housing solely by the valve body.

The base member may be comprised in the moveable member. The spacer may comprise a plunger spacer which may be provided in fixed relation to the moveable member. The method may comprise sliding the plunger spacer onto an axial portion of the moveable member. The fixing member may be comprised in the sealing member. The method may comprise press fitting the sealing member onto an axial portion of the moveable member.

The method may comprise providing a moveable member comprising an abutment for receiving one of the biasing member and the pressure compensation membrane. The method may further comprise assembling a spacer between the biasing member and the pressure compensation membrane to form a sub-assembly. The method may further comprise disposing the sub-assembly, or a component of it, against the moveable member. The method may comprise disposing the sealing member at a laterally or radially inner portion of the sub-assembly or a component of the sub-assembly. The method may further comprise affixing a sealing member to the moveable member to retain the sub-assembly between the sealing member and the moveable member. The sub-assembly may be retained against the moveable member solely by the sealing member.

According to a second aspect of the present invention there is provided a valve comprising any or all of:
  a valve body, the valve body comprising a first fluid port, a second fluid port and a fluid path providing fluid communication therebetween;
  a moveable member configured to vary a flow restriction in the fluid path by advancing a sealing member toward or away from a valve seat of the valve;
  a biasing member configured to bias the moveable member toward or away from the valve seat;
  a pressure compensation membrane configured to provide at least one surface on which a pressure from at least one of the first and second fluid ports can act to provide a pressure compensating force on the moveable member;
  a base member comprising an abutment for receiving one of the biasing member and the pressure compensation membrane; and
  a fixing member;
  wherein the biasing member and the pressure compensation membrane are retained between the fixing member and the abutment by a fixation of the fixing member to the base member.

The valve of the invention therefore provides an improved valve structure which is more efficiently configured, and which is therefore more efficient to manufacture and assemble. The biasing member and the pressure compensation membrane being retained between the fixing member and the abutment by a connection between the fixing member and the base member can ensure the appropriate positioning of the biasing member and the pressure compensation membrane using a connection between the fixing member and the base member. In such an arrangement, no other fixing means, or fixing operation, may be required to retain the assembly in its appropriately assembled state. The term fixation in this context therefore implies a retaining feature such as an interference fit, a threaded engagement, a glued interface, for example.

The base member may be comprised in a shoulder of the valve housing. The fixing member may comprise the valve body. The fixing member may comprise at least one of the first and second fluid ports. The fixing member may comprise a recess for receiving a portion of the pressure compensation membrane or a portion of the biasing member. The spacer may be an annular member, such as a washer, receivable by an inner wall of the housing.

The base member may be comprised in the moveable member. The base member may be comprised in a magnetic member of the moveable member. The abutment may comprise an axially-facing face of the moveable member. The base member may define an annular face of a laterally or radially extending cavity configured to receive the biasing member or pressure compensation membrane. The fixing member may comprise a sealing member of the moveable member, the sealing member configured to restrict flow in the fluid path. The sealing member may be disposed around, and may be provided in fixed relation to, the moveable member. The sealing member may be disposed around a pressure compensation port defined in the moveable member. The sealing member may comprise a threaded engagement or an interference fit with the moveable member.

A first lateral portion of the biasing member may be held in non-pivoting fixed relation to the moveable member. A second lateral portion of the biasing member may be held in non-pivoting fixed relation to the valve body.

The moveable member, which may be referred to as a plunger, may be actuated by an electromagnetic actuation means, such as a solenoid, which may comprise a coil wrapped around a magnetic core.

The first lateral portion may be located, held or clamped, in a first laterally extending cavity. Clamping generally implies a positive force is applied to opposing sides or faces of the component to retain it in a state of compressive stress and can reduce unwanted movement of the clamped member.

The first laterally extending cavity may be comprised in the moveable member. The first laterally extending cavity may comprise opposing faces of the moveable member. The moveable member may comprise a plurality of components. The first laterally extending cavity may be comprised between faces of at least two of the plurality of components.

The second lateral portion may be located, held or clamped, in a second laterally extending cavity. The second laterally extending cavity may be comprised in the valve body. The second laterally extending cavity may comprise opposing faces of the valve body. The valve body may comprise a plurality of body components. The second laterally extending cavity may be comprised between faces of at least two of the plurality of body components.

The first lateral portion may be provided laterally inwards of the second lateral portion. Laterally inwards may be considered to be a position nearer to a centre of the moveable member or valve body.

The biasing member may be configured to bias the moveable member towards the closed position. The valve may be configured such that when the biasing member is moved away from its equilibrium position, an increased tension force is exerted in the biasing member.

The biasing member may be clamped at its first lateral portion. The biasing member may be clamped at its second lateral portion. The biasing member may be configured such that the biasing force exerted by the biasing member on the moveable member varies non-linearly with an axial displacement of the moveable member.

The pressure compensation membrane may comprise a moveable portion which is moveable when the moveable member is displaced. The pressure compensation membrane may further comprise a fixed portion retained relative to the valve body between opposing surfaces. The opposing surfaces may be arranged such that a compressive strain applied to the fixed portion is defined only by the thickness of the membrane and a depth of a recess provided in the valve body.

The fixed portion may be provided in a laterally or radially extending cavity. The laterally or radially extending cavity may be provided between adjacent abutting components. The fixed portion may be directly adjacent to the moveable portion.

The pressure compensation membrane may comprise a moveable retained portion. The moveable retained portion may be retained in a laterally or radially extending cavity of the moveable member. An axial dimension of the laterally or radially extending cavity may be defined by axially abutting components of the moveable member.

The base member may be a first base member comprised in at least a portion of a housing of the valve body. The abutment may be a first abutment and the fixing member may be a first fixing member comprised in at least a portion of the valve body. The valve may further comprise a second base member comprised in the moveable member. The second base member may comprise a second abutment for receiving one of the biasing member and the pressure compensation membrane. The valve may further comprise a second fixing member. The biasing member and the pressure compensation membrane may be retained between the second fixing member and the second abutment by a fixation of the second fixing member to the second base member. The first abutment may comprise a shoulder of the housing. The first and second abutments may receive the biasing member.

BRIEF DESCRIPTION OF THE DRAWINGS

Further features and advantages of the present invention will become apparent from the following description of embodiments thereof, presented by way of example only, and by reference to the drawings, wherein.

DETAILED DESCRIPTION

Figure 1:
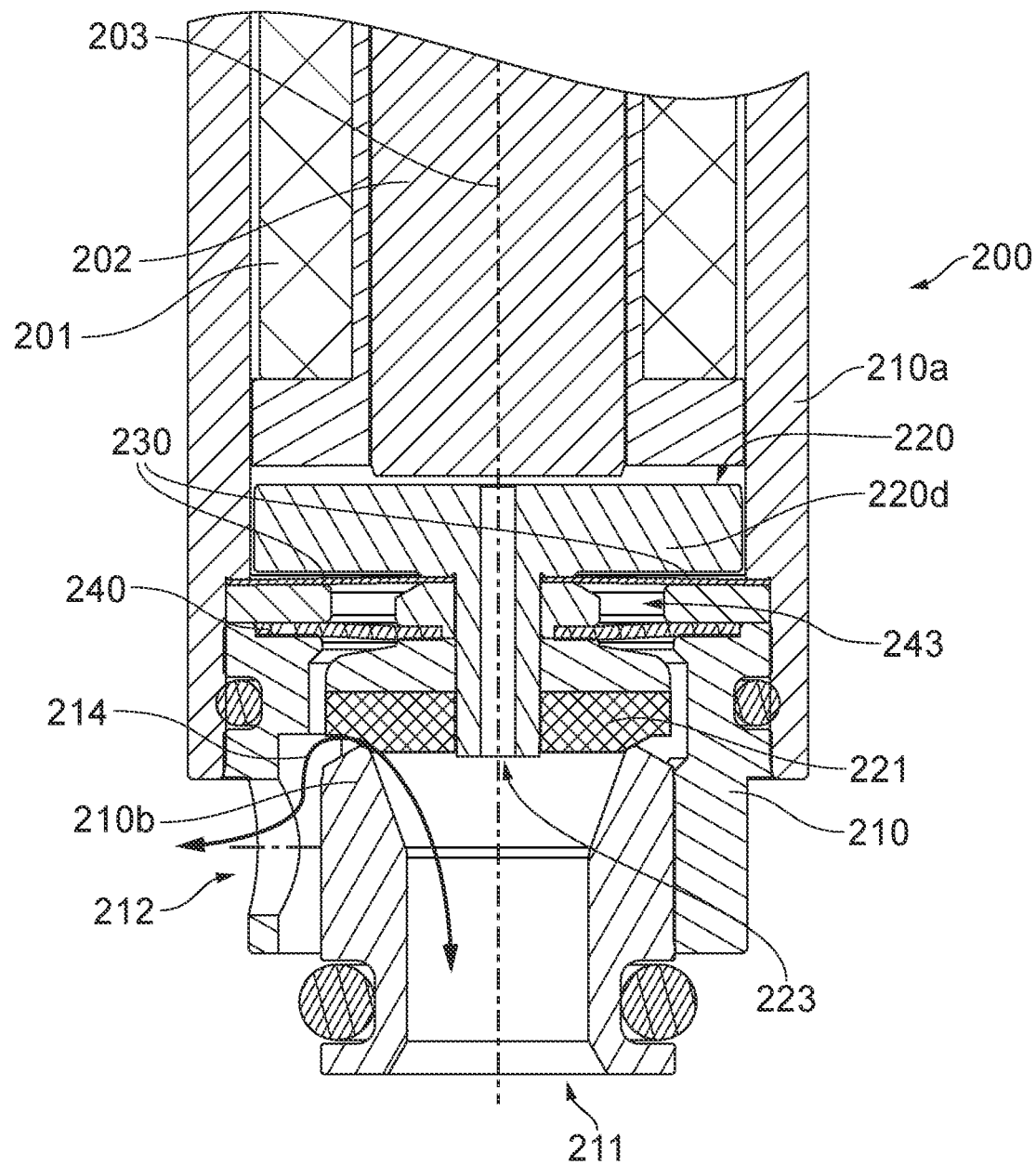
FIG. 1 is a cross-sectional diagram illustrating described embodiments of a valve according to the present invention.

FIG. 1 shows a cross-sectional view of a valve 200. The valve 200 comprises a valve body 210. The valve 200 may comprise a housing 210a, which may be a separate part to the valve body 210. The housing 210a is substantially cylindrical and may be provided with its longitudinal axis parallel to an axis 203 of the valve 200. The valve body 210 may be receivable within the housing 210a and secured thereto by an interference fit or a threaded engagement, for example. The valve body 210 comprises a first fluid port 211 and a second fluid port 212. A fluid path 214 provides fluid communication between the first fluid port 211 and the second fluid port 212. Fluid may be communicated through the fluid path 214 in either direction, that is to say that fluid may be communicated from the first fluid port 211 to the second fluid port 212 or from the second fluid port 212 to the first fluid port 211, as illustrated by the double-headed arrow in FIG. 1. In the illustrated arrangement, the first fluid port 211 is provided by an orifice of a cylindrical valve seat portion 210b which is concentrically received in the valve body 210, while the second fluid port 212 is provided by an orifice of the valve body 210 extending in a direction perpendicular to the axis 203. In an alternative arrangement, the cylindrical valve seat portion 210b may be an integral part of the valve body 210.

The valve 200 further comprises a moveable member, typically referred to as a plunger 220, that can be actuated to vary a flow restriction in the valve, for example between an open position and a closed position. In FIG. 1, the plunger 220 is shown to be in its closed position. In the illustrated arrangement, the plunger 220 comprises a valve seal 221 fixed to an axial surface of the plunger 220 for sealing against the cylindrical valve seat portion 210b. The valve seal 221 may be provided on a sealing member 220b of the plunger 220. The sealing member 220b may be a separate component fixed to the plunger 220, for example by an interference fit or a threaded engagement. The sealing member 220b may be disposed around an axial portion 220e of the plunger 220. In the closed position, the plunger 220 is configured to restrict flow in the fluid path 214 between the first fluid port 211 and the second fluid port 212.

The plunger 220 can be actuated along the axis 203 by an actuator, for example an electromagnetic actuator such as a solenoid, to vary a flow restriction in the valve. In this illustrated arrangement, the solenoid is provided in the housing 210a and comprises a coil 201 disposed around a core 202 and means (not shown) to energise the coil 201, by applying an electrical current. A magnetic circuit can be provided through the core 202 and housing 210a in a conventional manner, such that when energised by conventional energising means (i.e. a source of electric current) a magnetic field actuates the magnetic member 220d relative to the core 202. The plunger 220, which may comprise the magnetic member 220d, can therefore be actuated by the solenoid when the coil 201 is energised by way of a magnetic field operating on the plunger 220. In this way, energising the coil 201 can move the plunger 220 towards its open position. In alternative arrangements, the plunger 220 and the solenoid may be configured such that energising the coil 201 moves the plunger 220 towards its closed position, or switches the plunger 220 between two or more positions to control the flow of fluid between two or more fluid ports. By varying the power supplied to the solenoid, the plunger 220 may be held in any one of a plurality of positions between its resting position and its position of closest contact with the core 202.

Further detail of the valve 200 will now be described with reference to FIGS. 1 and 2. The valve 200 comprises a biasing member 230. The biasing member 230 is configured to bias the moveable member or plunger 220 toward or away from the cylindrical valve seat portion 210b, for example to bias the plunger 220 toward a first of its open and closed positions. The biasing member 230 may comprise a spring, preferably a flat spring, such as a plate spring. The biasing member 230 may comprise a plurality of biasing components arranged radially around the axis 203. In the illustrated example, the biasing member 230 is configured to bias the plunger 220 towards its closed position and may have an equilibrium position at or near a position in which the plunger 220 is in its closed position. The biasing member may be arranged to actively retain the plunger in its closed position, applying a biasing force even when in the closed position. This may be achieved by configuring the biasing member 230 to have a preload when the plunger 220 is in its resting position. This optional preload is represented by a slight curvature of the biasing member 230 in FIGS. 1 and 2. In an alternative arrangement, such as one in which energising the coil 201 moves the plunger 220 towards its closed position, the biasing member 230 may be configured to bias the plunger 220 away from the cylindrical valve seat portion 210b, which may be towards its open position. In either case, the biasing member 230 exerts a biasing force on the plunger 220 in a direction opposite to the magnetic force provided by the solenoid.

The biasing member 230 may comprise a first lateral portion 230a, a second lateral portion 230b, and a deformable portion 230c disposed between the first and second lateral portions. The biasing member or members is/are arranged to be retained in the valve assembly at the first and second lateral portions such that the deformable portion 230c provides a biasing force in response to its deflection during movement of the plunger 220. In the present context, a lateral direction is considered a direction substantially perpendicular to the direction of movement of the plunger between its open and closed positions. One example may be a flat spring, such as a plate spring, in which the first lateral portion 230a represents a portion of the biasing member 230 disposed to a plunger side of the deformable portion 230c. In the case of a circular or annular plate spring, this first lateral portion 230a may be a first radial portion, which may be disposed within a certain annulus about the axis 203, preferably in a radially extending cavity.

For arrangements in which the biasing member 230 comprises a plurality of biasing components, it will be appreciated that the first lateral portion 230a may comprise a plurality of portions of such biasing parts which lie to a plunger side of the deformable portion. In the case of a circular or annular plate spring, such first lateral portions may lie within a certain annulus about the axis 203. The first lateral portion 230a of the biasing member 230 is held in non-pivoting fixed relation to the plunger 220. In the example shown, the first lateral portion 230a is held in fixed relation to the plunger 220 such that it cannot pivot with respect to the plunger 220. The first lateral portion may be located in a first laterally extending cavity 231. The first laterally extending cavity 231 may be provided in fixed relation to the plunger 220. The first laterally extending cavity 231 may be comprised in the plunger 220 and may clamp the first lateral portion 230a of the biasing member 230. In the arrangement shown, the first laterally extending cavity 231 is provided between opposing faces of the plunger 220. Such opposing faces may be provided by one or more extensions of the plunger 220. An annular face of the plunger 220 may act as an abutment for receiving the first lateral portion 230a of the biasing member 230.

In the illustrated arrangement, the plunger 220 has a substantially T-shaped cross section, and further comprises a plunger spacer 220a. The plunger spacer 220a may extend laterally from an axial portion 220e of the plunger 220. The plunger spacer 220a may be a separate component. The plunger spacer 220a may be fixed to the plunger 220, such as by an interference fit, for example. The plunger spacer 220a may be provided around the axis 203 and may be provided radially or laterally inwards of the housing 210a and/or the valve body spacer 210c. The plunger spacer 220a may be at or adjacent to a radially or laterally inner edge of the biasing member 230 (e.g. the first lateral portion 230a) or a radially or laterally inner edge of the pressure compensation membrane 240 (e.g. the moveable retained portion 240a). The first laterally extending cavity 231 may be provided between the T-shaped magnetic member 220d of the plunger 220 and the plunger spacer 220a. In a more general sense, the first laterally extending cavity may be formed between opposing faces of the plunger 220. The plunger may comprise multiple components and the first laterally extending cavity 231 may be formed between opposing faces of separate components of the plunger 220.

In the example of the biasing member 230 being a plate spring, the second lateral portion 230b represents a portion of the biasing member 230 disposed to a valve body side of the deformable portion 230c. In the case of a circular or annular plate spring, the second lateral portion 230b may be a second radial portion, which may be disposed within a certain annulus about the axis 203, preferably in a radially extending cavity. For arrangements in which the biasing member 230 comprises a plurality of biasing components, it will be appreciated that the second lateral portion 230b may comprise a plurality of portions of such biasing parts which lie to a valve body side of the deformable portion 230c. In the case of a circular or annular plate spring, such second lateral portions may lie within a certain annulus about the axis 203. The second lateral portion 230b of the biasing member 230 is held in non-pivoting fixed relation to the valve body 210. In the example shown, the second lateral portion 230b is held in fixed relation to the valve body 210 such that it cannot pivot with respect to the valve body 210. The second lateral portion 230b may be located in a second laterally extending cavity 232. The second laterally extending cavity 232 may be provided in fixed relation to the valve body 210. The second laterally extending cavity 232 may be comprised in the valve body 210 and may clamp the second portion 230b of the biasing member 230. In the arrangement shown, the second laterally extending cavity 232 is provided between opposing faces of the valve body 210. Such opposing faces may be provided by one or more extensions of the valve body 210.

In the illustrated arrangement, the second laterally extending cavity 232 is provided between a shoulder 213 and a valve body spacer 210c of the valve body 210. The shoulder 213 may be provided at an inner wall of the housing 210a. The shoulder 213 may act as an abutment for receiving a portion of the biasing member 230. In the arrangement shown, the shoulder 213 receives the second lateral portion 230b of the biasing member 230.

In the arrangement shown, the valve body spacer 210c comprises an annular member provided concentrically within, but separate to, the housing 210a. The valve body spacer 210c may be provided around the axis 203 and may be provided radially or laterally inwards of the housing 210a. The valve body spacer 210c may be at or adjacent to a radially or laterally outer edge of the biasing member 230 (e.g. the second lateral portion 230b) or a radially or laterally outer edge of the pressure compensation membrane 240 (e.g. the fixed portion 240b). The second laterally extending cavity 232 may be provided between the shoulder 213 and the valve body spacer 210c. In a more general sense, the second laterally extending cavity 232 may be formed between opposing faces of the valve body. The valve body may comprise multiple components and the cavity may be formed between opposing faces of separate components of the valve body.

In the illustrated arrangement, the first lateral portion 230a is a radially inner portion of the biasing member 230 and the second lateral portion 230b is a radially outer portion of the biasing member 230. Therefore, the first lateral portion 230a may be provided radially inwards of the second lateral portion 230b.

As described, two lateral portions 230a, 230b of the biasing member 230 may be located in laterally extending cavities 231, 232 which are provided in fixed relation to the plunger 220 and the valve body 210 respectively. The biasing member 230 may be clamped, for example by an interference fit, at its first lateral portion 230a and the second lateral portion 230b in the laterally extending cavities 231, 232 to further secure the biasing member 230 between the plunger 220 and the valve body 210.

The valve 200 may be configured such that when the plunger 220 is actuated towards its open position (upwards in FIGS. 1 and 2), the first lateral portion 230a of the biasing member 230 will be moved along the axis 203 relative to the second lateral portion 230b by virtue of the location of the lateral portions 230a, 230b in their respective laterally extending cavities 231, 232. In other words, the first lateral portion 230a will be moved along the axis 203 with respect to the valve body 210, while the second lateral portion 230b will maintain its position along the axis 203 relative to the valve body 210.

Figure 2:
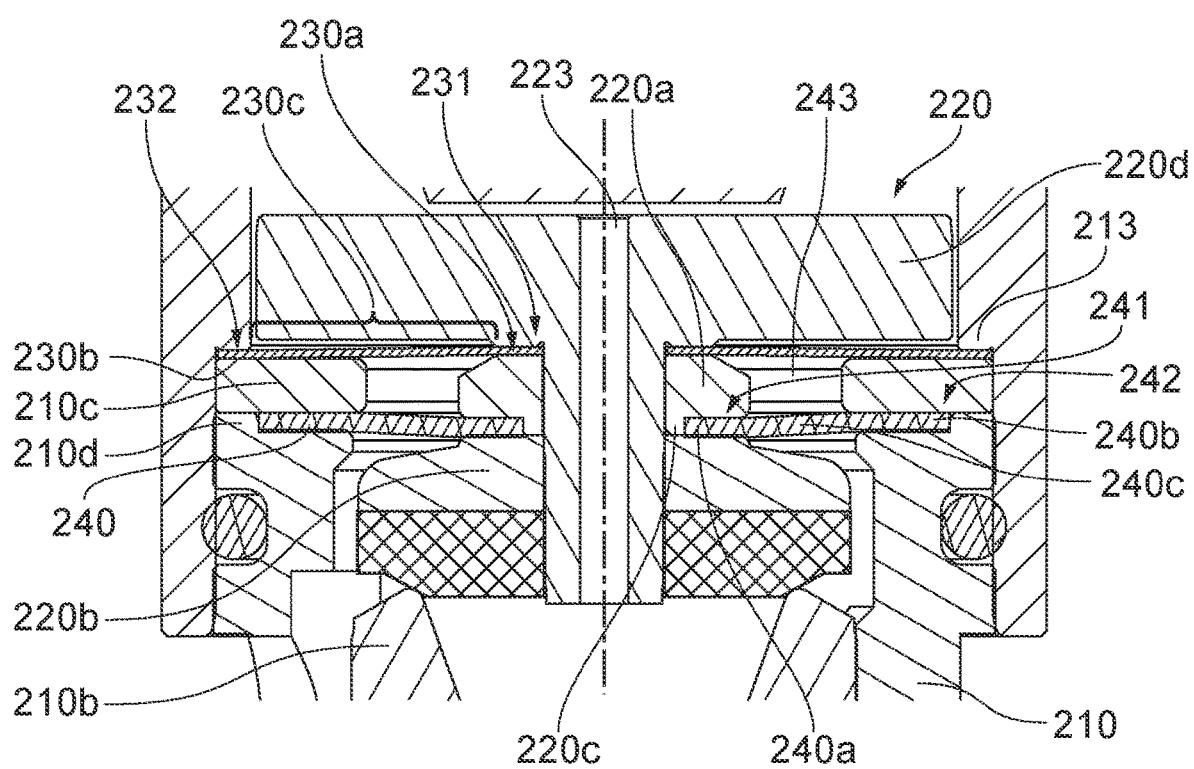
FIG. 2 is an enlarged cross-sectional diagram illustrating described embodiments of a valve according to the present invention.

The valve 200 may further comprise a pressure compensation membrane 240 as shown in FIGS. 1 and 2. The pressure compensation membrane 240 is configured to provide at least one surface on which a pressure from at least one of the first fluid port 211 and the second fluid port 212 can act to provide a pressure compensating force on the plunger 220. The pressure compensation membrane 240 may comprise a substantially annular diaphragm provided radially around the axis 203. The pressure compensation membrane 240 may be comprised of a resilient material, such as an elastomeric material. The elastomeric material may comprise nitrile-butadiene (NBR) rubber, ethylene propylene diene monomer (EPDM) rubber, fluoroeslastomer (FPM) and/or perfluoroelastomer (FFPM).

A pressure compensation port 223 may be provided as a lumen within the plunger 220 through which fluid may be communicated. The pressure compensation port 223 may extend through the axial portion 220e of the plunger 220. The plunger spacer 220a and/or the sealing member 220b may be disposed around the pressure compensation port 223. The pressure compensation port 223 may be in fluid communication with the first fluid port 211. The pressure compensation port 223 may comprise an entrance at an axial face of the plunger 220 in the first fluid port 211. The entrance to the pressure compensation port 223 may be provided radially inwards of the cylindrical valve seat portion 210b such that fluid communication between the pressure compensation port 223 and the first fluid port 211 is maintained irrespective of the axial position of the plunger 220. In the arrangement shown, the pressure compensation port 223 is configured to communicate fluid between the first fluid port 211 and a pressure compensation chamber 243. The biasing member 230 and/or the plunger 220 may comprise one or more cavities (not shown) to facilitate the flow of fluid from the pressure compensation port 223 to the pressure compensation chamber 243. A first surface of the pressure compensation membrane 240 may at least partially define the pressure compensation chamber 243. A second surface of the pressure compensation membrane 240 may at least partially define the second fluid port 212.

The pressure compensation membrane 240 may comprise a moveable portion 240c which is moveable when the plunger 220 is displaced. The moveable portion 240c may be deformable along the axis 203 in response to movement of the plunger 220. The moveable portion 240c may comprise a compensation surface against which the pressure of fluid in the pressure compensation chamber 243 may act. The moveable portion 240c may extend between retained portions of the pressure compensation membrane 240. The pressure compensation membrane 240 further comprises a fixed portion 240b retained relative to the valve body 210 between opposing surfaces. Such opposing surfaces may be comprised in the valve body spacer 210c and the valve body 210. A compressive strain applied to the fixed portion 240b is defined only by a thickness of the pressure compensation membrane 240 and a depth of a recess provided in a component of the valve body. The recess may be provided as a counterbore in the valve body 210. A majority of the fixed portion 240b may be directly retained between adjacent abutting components. The adjacent abutting components may comprise the valve body spacer 210c and the valve body 210. The entirety of the fixed portion 240b may be directly retained between the adjacent abutting components. A surface area of the moveable portion 240c may be a function of a lateral or radial dimension of the valve body spacer 210c. The fixed portion 240b may at least partially be provided, preferably clamped, in a second laterally or radially extending cavity 242 located between the valve body spacer 210c and the valve body 210. In the arrangement shown, the fixed portion 240b is provided in the second laterally or radially extending cavity 242 between the adjacent abutting components, and the moveable portion 240c is directly adjacent to the fixed portion 240b.

The valve body spacer 210c is one example of a spacer for separating a portion of the biasing member 230 from a portion of the pressure compensation membrane 240. In the arrangement shown, the valve body spacer 210c is configured to separate the second lateral portion 230b of the biasing member 230 from the fixed portion 240b of the pressure compensation membrane 240.

The plunger spacer 220a is another example of a spacer for separating a portion of the biasing member 230 from a portion of the pressure compensation membrane 240. In the arrangement shown, the plunger spacer 220a is configured to separate the first lateral portion 230a of the biasing member 230 from the moveable retained portion 240a of the pressure compensation membrane 240.

The pressure compensation membrane 240 may comprise a moveable retained portion 240a which is held in fixed relation to the plunger 220. The moveable retained portion 240a may be retained in a laterally or radially extending cavity 241 of the plunger 220. The moveable retained portion 240a is moveable in the sense that it can be displaced along the axis 203 by virtue of its fixed relation to the plunger 220. An axial dimension of the laterally or radially extending cavity 241 is defined by axially abutting components of the plunger 220. In the arrangement shown, the moveable retained portion 240a is located, preferably clamped, in the laterally or radially extending cavity 241 provided between the plunger spacer 220a and the sealing member 220b of the plunger 220. The moveable retained portion 240a, fixed portion 240b and the moveable portion 240c may be comprised in substantially annular portions of the pressure compensation membrane 240. The moveable retained portion 240a may be provided laterally or radially inwards of the fixed portion 240b. The moveable retained portion may be provided laterally or radially inwards of the moveable portion 240c. The moveable portion 240c may be provided in a lateral or radial position between that of the moveable retained portion 240a and the fixed portion 240b.

As will be appreciated, pressure from fluid in the first fluid port 211 may provide a first force on an axial face of the sealing member 220b to move the plunger 220 towards its open position. The first force may be compensated by the pressure compensating force by way of the arrangement described herein. A fluid pressure of fluid in the first fluid port 211 can act on the plunger 220, via the pressure compensation membrane 240, to provide a pressure compensating force. The pressure compensating force may act to move the plunger 220 towards its closed position. In this way, when the plunger 220 is in its closed position, any increase in pressure in the first fluid port 211 acting on the sealing member 220b, which may otherwise move the plunger 220 towards its open position, can be compensated by the pressure in the pressure compensation chamber 243 acting on the pressure compensation membrane 240. Therefore, the plunger 220 can control fluid flow irrespective of variations in pressure. Similarly, fluid in the second fluid port 212, such as that which has been communicated thereto from the first fluid port 211 via the fluid path 214, may act on the second surface of the pressure compensation membrane 240 to provide a force in the direction of the open position of the plunger 220.

The arrangement of pressure compensation components described hereinabove provides numerous advantages over prior art arrangements. The pressure compensating surface of the moveable portion 240c, that is, the surface exposed to fluid in the pressure compensation chamber 243, can be tuned by controlling the lateral or radial dimension of the valve body spacer 210c and/or the plunger spacer 220a, thereby allowing for precise control of the pressure compensation force.

The axial dimension of the pressure compensation membrane 240 in the illustrated arrangement is dependent only on the dimensions and relative positions of the valve body spacer 210c, the valve body 210, the plunger spacer 220a and the sealing member 220b. More specifically, an axial dimension of the moveable retained portion 240a is dependent only on the dimensions and relative positions of components of the plunger 220 such as the plunger spacer 220a and the sealing member 220b, while an axial dimension of the fixed portion 240b is dependent only on the dimensions and relative positions of components of the valve body 210 and the valve body spacer 210c. Moreover, the axial dimension of the fixed portion 240b (which may be the laterally or radially outermost portion of the pressure compensation membrane 240) may be dependent only on an axial dimension of a shoulder 210d, which may extend axially from the valve body. Similarly, the axial dimension of the moveable retained portion 240a (which may be the laterally or radially innermost portion of the pressure compensation membrane 240) is dependent only on an axial dimension of a shoulder 220c, which may extend axially from the plunger 220. The shoulder 220c may extend axially from the plunger spacer 220a of the plunger 220. By limiting the number of components on which the dimensions of the pressure compensation membrane 240 depends, the accumulation of manufacturing tolerances is reduced, thereby reducing the overall error in an axial dimension of the cavity in which the pressure compensating membrane 240 is retained. Advantageously, this increases the predictability and controllability of the pressure compensation characteristics of the valve 200 as well as the forces required for assembly and a resulting clamping force on the membrane.

A sub-assembly of the valve 200 may comprise the biasing member 230 and the pressure compensation membrane 240. The sub-assembly may also comprise a spacer. The spacer may be configured to separate a portion of the biasing member 230 from a portion of the pressure compensation membrane 240. A base member of the valve 200 comprises an abutment for receiving one of the biasing member 230 and the pressure compensation membrane 240. A fixing member of the valve 200 may be configured to retain the sub-assembly against the abutment. In other words, the fixing member may be configured to provide a force, or a stop, or barrier, to secure the sub-assembly adjacent the base member. This arrangement can be applied to the laterally inner and/or the laterally outer portion of the valve assembly.

Figure 3:
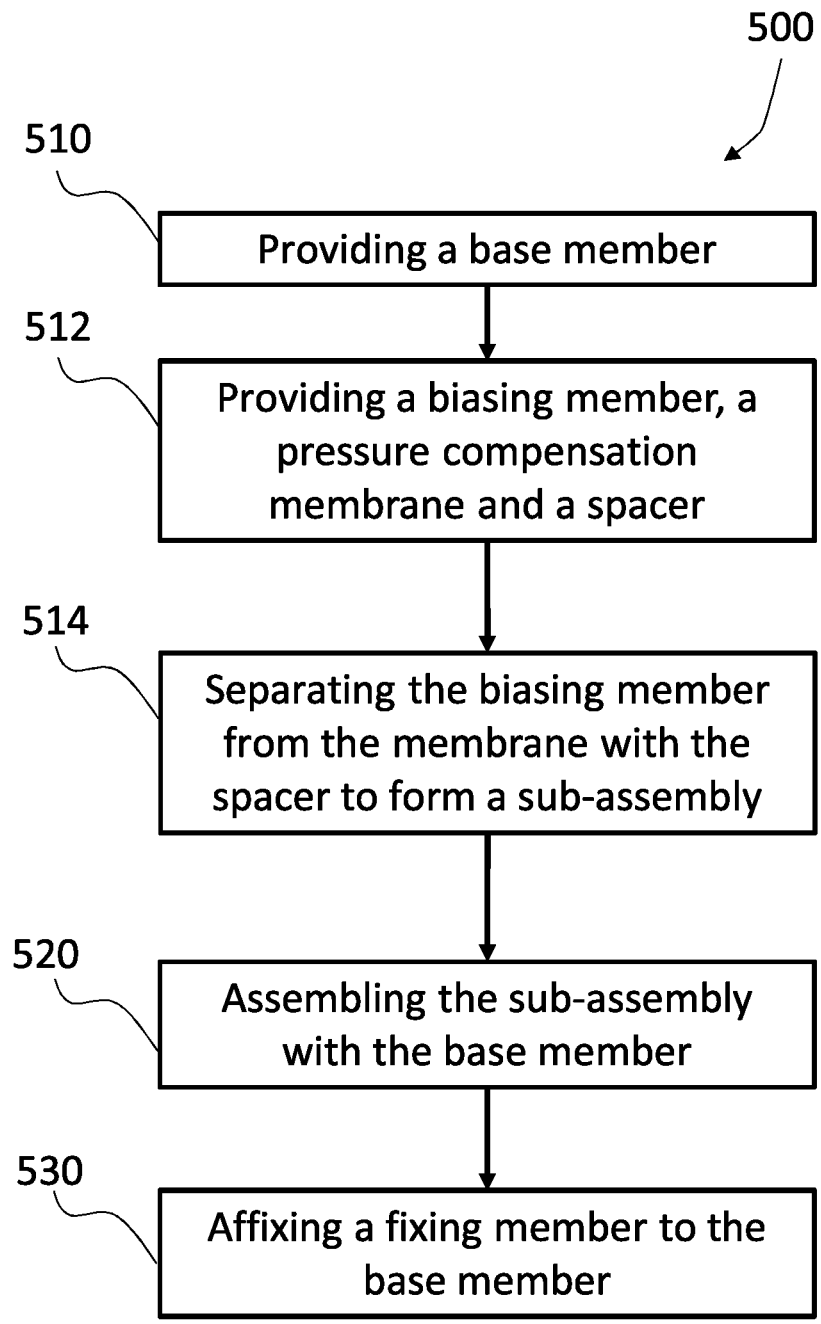
FIG. 3 is flowchart illustrating described embodiments of a method according to the present invention.

With reference to FIG. 3, a method 500 of assembling the valve can comprise step 510 of providing a base member. The method 500 may further comprise the step 512 of providing a biasing member, a pressure compensation membrane and optionally a spacer. The base member may comprise an abutment for receiving one of the biasing member and the pressure compensation membrane. The method 500 may further comprise a step 514 of arranging the biasing member in spaced arrangement from the membrane using the spacer to form a sub-assembly. The method may comprise assembling the biasing member and the pressure compensation membrane with the base member. This step may comprise the step 520 of assembling the sub-assembly with the base member. In other words, the spacer may be sandwiched between a portion of the biasing member 230 and a portion of the pressure compensation membrane 240 to provide the sub-assembly, which is assembled together with the base member. The method 500 may further comprise a step 530 of affixing a fixing member to the base member to retain both the biasing member and the pressure compensation membrane between the fixing member and the abutment. This step may therefore retain the sub-assembly between the fixing member and abutment.

At the laterally or radially outer portion, the valve body spacer 210c can separate the second lateral portion 230b of the biasing member 230 from the fixed portion 240b of the pressure compensation membrane 240. The shoulder 213, which provides an abutment for receiving the second lateral portion 230b of the biasing member 230, may comprise the base member. The valve body 210, which is fixable to the housing 210a by an interference fit, for example, may comprise the fixing member.

At the laterally or radially inner portion, the plunger spacer 220a can separate the first lateral portion 230a of the biasing member 230 from the moveable retained portion 240a of the pressure compensation membrane 240. The annular face of the plunger 220 that defines the first laterally extending cavity 231 and which provides an abutment to receive the first lateral portion 230a of the biasing member may comprise the base member. The sealing member 220b, which is fixable to the plunger 220 by an interference fit, for example, may comprise the fixing member.

The advantageous arrangement may be adopted at one or both of the laterally (or radially) inner or outer portions of the valve 200 using some or all of the steps of the following method, which may be performed in a sequence other than that in which they are recited. The method includes providing a housing 210a (defining a base member) and inserting a plunger 220 (also defining a base member) into the housing 210a.

The method may further include inserting the biasing member 230 into the housing 210a such that its first lateral portion 230a is received by the abutment on the plunger 220 and its second lateral portion is received by the abutment on the shoulder 213. The method may further include sliding the plunger spacer 220a around the axial portion 220e of the plunger 220 and fitting the valve body spacer 210c within the inner wall of the housing 210a. The method may further include providing the pressure compensation membrane 240 such that its moveable retained portion 240a is in contact with the plunger spacer 220a and its fixed portion 240b is in contact with the valve body spacer 210c. In this way, the sub-assembly is provided. The biasing member 230 and the pressure compensation membrane 240 may form a sub-assembly with the valve body spacer 210c, and they may form another sub-assembly with the plunger spacer 220a.

The method further includes securing the sealing member 220b to the plunger 220, i.e. affixing a fixing member to a base member, to retain the sub-assembly between the sealing member 220b and the abutment, thereby holding the biasing member 230 and the pressure compensation membrane 240, particularly the laterally inner portions thereof, in non-pivoting fixed relation to the plunger 220. The method further includes securing the valve body 210 to the housing 210a, i.e. affixing a fixing member to a base member, to retain the sub-assembly between the valve body 210 and the abutment (i.e. the shoulder 213), thereby holding the biasing member 230 and the pressure compensation membrane 240, particularly the laterally outer portions thereof, in non-pivoting fixed relation to the valve body 210.

Preferably, the sub-assembly is secured at the base member solely by a retention force provided by the fixing member. At the laterally outer portion of the valve, the interference fit, for example, between the valve body 210 and the housing 210a provides a frictional force which retains the sub-assembly in position adjacent to the abutment. Furthermore, the axial position of the sub-assembly may be determined solely by the position of the valve body 210 relative to the housing 210a. At the laterally inner portion of the valve, the interference fit, for example, between the plunger spacer 220a and the plunger 220 provides a frictional force which retains the sub-assembly in position adjacent to the abutment and the axial position of the sub-assembly may be determined solely by the position of the plunger spacer 220a relative to the plunger 220.

Various modifications, whether by way of addition, deletion and/or substitution, may be made to all of the above-described embodiments to provide further embodiments, any and/or all of which are intended to be encompassed by the appended claims.

The invention claimed is:

1. A method for assembling a valve, the valve comprising: a valve body, the valve body comprising a first fluid port, a second fluid port and a fluid path providing fluid communication therebetween; a housing; a moveable member configured to be actuated to vary a flow restriction in the fluid path by advancing a sealing member toward or away from a valve seat of the valve; a biasing member configured to bias the moveable member toward or away from the valve seat; and a pressure compensation membrane configured to provide at least one surface on which a pressure from at least one of the first and second fluid ports can act to provide a pressure compensating force to the moveable member, the valve being configured such that fluid pressure from the first fluid port or the second fluid port acts on a side of the pressure compensation membrane facing away from the valve seat, the method comprising the steps of: providing a base member comprising an abutment for receiving at least a first of the biasing member and the pressure compensation membrane, inserting the biasing member, pressure compensation membrane and moveable member into the housing, assembling the biasing member and the pressure compensation membrane with the base member, and affixing a fixing member to the base member to retain both the biasing member and the pressure compensation membrane between the fixing member and the abutment, wherein the base member is at least a portion of the housing, and wherein the fixing member is at least a portion of the valve body and the method comprises introducing the fixing member into the housing to affix the fixing member to the housing.

2. The method according to claim 1, further comprising the step of providing a spacer disposed between the biasing member and the pressure compensation membrane for separating at least a portion of the biasing member from at least a portion of the pressure compensation membrane.

3. The method according to claim 2, wherein the step of affixing the fixing member comprises retaining a second of the biasing member and the pressure compensation membrane between the fixing member and the spacer.

4. The method according to claim 2, further comprising introducing the spacer into the housing and retaining the spacer in fixed relation to the housing by the fixing member.

5. The method according to claim 1, wherein the abutment comprises a shoulder of the housing.

6. The method according to claim 1, wherein the base member is a first base member and the valve further comprises a second base member as at least a portion of the moveable member.

7. The method according to claim 6, wherein the method comprises sliding a second spacer onto an axial portion of the moveable member and retaining the second spacer in fixed relation to the moveable member by a second fixing member.

8. The method according to claim 7, wherein the second fixing member is comprised in the sealing member and wherein the method comprises press fitting the sealing member onto the axial portion of the moveable member.

9. A valve comprising: a valve body, the valve body comprising a first fluid port, a second fluid port and a fluid path providing fluid communication therebetween; a housing; a moveable member configured to vary a flow restriction in the fluid path by advancing a sealing member toward or away from a valve seat of the valve; a biasing member configured to bias the moveable member toward or away from the valve seat; a pressure compensation membrane configured to provide at least one surface on which a pressure from at least one of the first and second fluid ports can act to provide a pressure compensating force on the moveable member, the valve being configured such that fluid pressure from the first fluid port or the second fluid port acts on a side of the pressure compensation membrane facing away from the valve seat; a base member comprising an abutment for receiving one of the biasing member and the pressure compensation membrane; and a fixing member disposed in the housing; wherein: the biasing member and the pressure compensation membrane are retained between the fixing member and the abutment by a fixation of the fixing member to the base member, the biasing member, pressure compensation membrane and moveable membrane are disposed in the housing, the base member is at least a portion of the housing, and the fixing member is at least a portion of the valve body.

10. The valve according to claim 9, wherein a first lateral portion of the biasing member is held in non-pivoting fixed relation to the moveable member; and wherein a second lateral portion of the biasing member is held in non-pivoting fixed relation to the valve body.

11. The valve according to claim 9, the base member being a first base member, the abutment being a first abutment, and the fixing member being a first fixing member, the valve further comprising: a second base member as at least a portion of the moveable member and comprising a second abutment for receiving one of the biasing member and the pressure compensation membrane; and a second fixing member, wherein the biasing member and the pressure compensation membrane are retained between the second fixing member and the second abutment by a fixation of the second fixing member to the second base member.

12. The valve according to claim 11, wherein the first abutment comprises a shoulder of the housing.

13. The valve according to claim 11, wherein the first and second abutments receive the biasing member.

14. The valve of claim 9, wherein the movable member comprises a lumen through which fluid is communicated from the first port or the second port to the side of the pressure compensation membrane facing away from the valve seat.

15. The valve of claim 9, further comprising:
a valve seal fixed to an axial surface of the movable member and configured to seal against the valve seat to block the fluid path when the movable member is unactuated.

16. The valve of claim 15, wherein the valve seal is provided on the sealing member.

* * * * *